United States Patent [19]

Lanty

[11] 4,309,755
[45] Jan. 5, 1982

[54] COMPUTER INPUT/OUTPUT ARRANGEMENT FOR ENABLING A SIMULTANEOUS READ/WRITE DATA TRANSFER

[75] Inventor: Henry A. Lanty, Chatham, N.J.

[73] Assignee: Bell Telephone Laboratories, Incorporated, Murray Hill, N.J.

[21] Appl. No.: 68,643

[22] Filed: Aug. 22, 1979

[51] Int. Cl.$^3$ .............................................. G06F 3/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,356,993 | 12/1967 | Sharp | 364/200 |
| 3,368,028 | 2/1968 | Windels et al. | 364/200 |
| 3,742,457 | 6/1973 | Calle et al. | 364/200 |
| 4,032,898 | 6/1977 | Grigoletti | 364/200 |
| 4,046,972 | 9/1977 | Huizinga | 179/99 |
| 4,048,673 | 9/1977 | Hendrie et al. | 364/200 |

OTHER PUBLICATIONS

The Western Electric Engineer, "MAC-8: A Microprocessor for Telecommunication Applications," H. H. Winfield, Jul. 1977, pp. 41, et seq.
Bell System Technical Journal, "Local Distribution System," E. C. Bender et al., May-Jun. 1975, pp. 919, et seq.

Primary Examiner—Gareth D. Shaw
Assistant Examiner—Eddie P. Chan
Attorney, Agent, or Firm—John A. Caccuro

[57] ABSTRACT

A computer input/output arrangement is disclosed which utilizes a rotate memory instruction of a computer instruction set for performing a bit by bit read/write data transfer between the computer memory and a connected peripheral device. The arrangement enables the rotate memory instruction to perform read and write steps simultaneously from memory and the peripheral device. During the read step data is simultaneously read from the memory location and the peripheral device into associated locations in a computer register. The register data is rotated such that the received data in the peripheral device bit location is rotated into the memory bit locations of the register while simultaneously rotating a memory data bit into the peripheral device bit location. The write step writes register data from the peripheral device bit location to the peripheral device while simultaneously writing the data from the memory bit locations into the memory.

13 Claims, 5 Drawing Figures

COMPUTER INPUT/OUTPUT ARRANGEMENT FOR ENABLING A SIMULTANEOUS READ/WRITE DATA TRANSFER

TECHNICAL FIELD

This invention relates to electronic computers and more particularly to input/output arrangements for connecting a peripheral device to a computer.

BACKGROUND OF THE INVENTION

In normal microprocessor (computer) operations data is received from a peripheral device in a two step process. In the first step data is read from a peripheral device into a microprocessor register. The second step involves writing data from the register into a microprocessor memory location. Likewise two steps are required to transmit data from the microprocessor to the peripheral device. A read from memory into the register step and a write from the register to the peripheral device step.

The serial burst data transfer rate of peripheral equipment connected to a microprocessor (computer) often exceeds the rate at which the microprocessor executes a read and write instruction. In such a circumstance an external buffer is required to temporarily store the high speed burst data received from the peripheral equipment and feed the data at a lower speed to the connected microprocessor. Note, while the short term burst data rate of the peripheral equipment may exceed the microprocessor's read/write data rate it is obvious that the long term data rate of the peripheral equipment must, to prevent any loss of data, be less than the read-write data rate of the microprocessor. In the prior art a shift register having a length equal to the length of the data burst is used to buffer both the input and output of the microprocessor. In addition to the shift register, complex clocking, multiplexing and demultiplexing circuits are required to properly interface the microprocessor to the peripheral equipment. The circuit complexity is further compounded for peripheral devices which operates in a simultaneous transmit/receive bit synchronous manner requiring a bit to be transmitted for each bit received.

It is thus a problem to interface serial high speed bit synchronous burst data operated peripheral equipment with a microprocessor incapable of reading and writing at the serial burst data rate.

SUMMARY OF THE INVENTION

I have recognized that all microprocessors incorporate a rotate instruction in their program instruction set. This rotate instruction operates in three steps, a first step reads a data word from an addressed memory location into a register, a second step rotates the register contents one or more bits and the third step writes the resulting register data word contents into the original addressed memory location. Recognizing that the rotate instruction includes a read step, a rotate step and a write step, I have discovered an arrangement for altering the source and destination of the data being transferred such that a bidirectional exchange of data can be effectuated between a microprocessor's memory and a peripheral device at a rotate instruction execution rate which is much faster than the rate possible utilizing the standard microprocessor read and write instructions.

My concept requires enabling both a simultaneous read, from an addressed memory location and the peripheral device, into a register and a simultaneous write from this register into an addressed memory location and the peripheral device. Additionally, the size of the register, into which data is written and from which data is read, must be equal to or greater than the sum of the bit width of the memory word and the bit width of the peripheral device data word which are written or read.

The operation of my invention includes activating a rotate instruction to a selected memory location. The arrangement detects access to this memory location and enables a simultaneous read from the peripheral device into the most significant bit of the register while the contents of the selected memory are read into the remaining bits of the register. The resulting contents of the register are rotated during the rotate step of the rotate instruction, such that the least significant bit of the register becomes the most significant bit while the most significant bit (peripheral data) is rotated into the next lower significant bit position. The arrangement also enables a simultaneous write, during the write step of the rotate instruction, of the most significant bit into the peripheral device while the remaining bits (including the received peripheral data) is written into the selected memory location.

Thus, my arrangement has enabled a bit for bit data exchange between a peripheral device and a microprocessor's memory within the execution time of one rotate instruction. This increased read/write exchange rate allows the microprocessor to operate with faster serial data operated peripheral equipment.

In existing microprocessor structures the bit width of the register is typically equal to the bit width of the microprocessor memory structure. Increasing the bit width of a register of an existing microprocessor may not be practical or may affect the operation of the register during the rotate instruction or other program instructions. Thus, if the register size cannot be increased to satisfy the conceptual requirement that the register bit width exceed the memory bit width, a means for selectively accessing a part of the data memory words is required for the preferred embodiment of my invention.

In the preferred embodiment of my inventive arrangement the first part of the data memory, the four most significant bits of memory, is made selectively accessible under control of a selecting means. The selecting means, operating under rotate instruction control, selectively enables the content of the receive device (peripheral buffer) containing the data received from the peripheral device to be read, during the read step, instead of the contents of the first part of the addressed data memory. Hence, during the read step of the rotate instruction, data is simultaneously read from a second part (the memory word minus the first part) of memory as well as from the receive device into the register. The content of the receive device is being read as the least significant bit of the first part of the register. The contents of the register is rotated, during the rotate step, to move the data from the receive device into the second part of the register while rotating the least significant bit into the most significant bit of the first part of the register. Finally, during the write step of the rotate instruction the content in the most significant bit of the first part of the register is written into the transmit device simultaneously with the writing of data from the second part of the register (including the content from the receive device) into the second part of memory.

Thus, during the execution of one rotate instruction the content of the receive device is read into the data memory in exchange for a data bit of the data memory written into the transmit device. The resulting decrease in read/write cycle time is possible with any computer having both a standard rotate command and a data memory whose contents can be separately controlled by attaching the disclosed arrangement.

It is a feature of the present invention to provide a computer input/output arrangement having both separate controllable access to an upper and a lower bit parts of data word memory and a rotate program instruction operable under program control for enabling a read and write operation to a serial data operated peripheral device.

It is a further feature of the present invention to utilize a split data memory having separately controllable parts which store the upper and lower bits of each data word.

It is a further feature of the present invention to selectively activate the present invention by detecting the address of memory words accessed by the rotate program command.

These and other features of the present invention will become apparent from the system description and attached drawings.

BRIEF DESCRIPTION OF THE DRAWINGS

The operation and utilization of the disclosed invention will be more apparent from the following detailed description taken in conjunction with the drawing in which.

DETAILED DESCRIPTION

Figure 1:
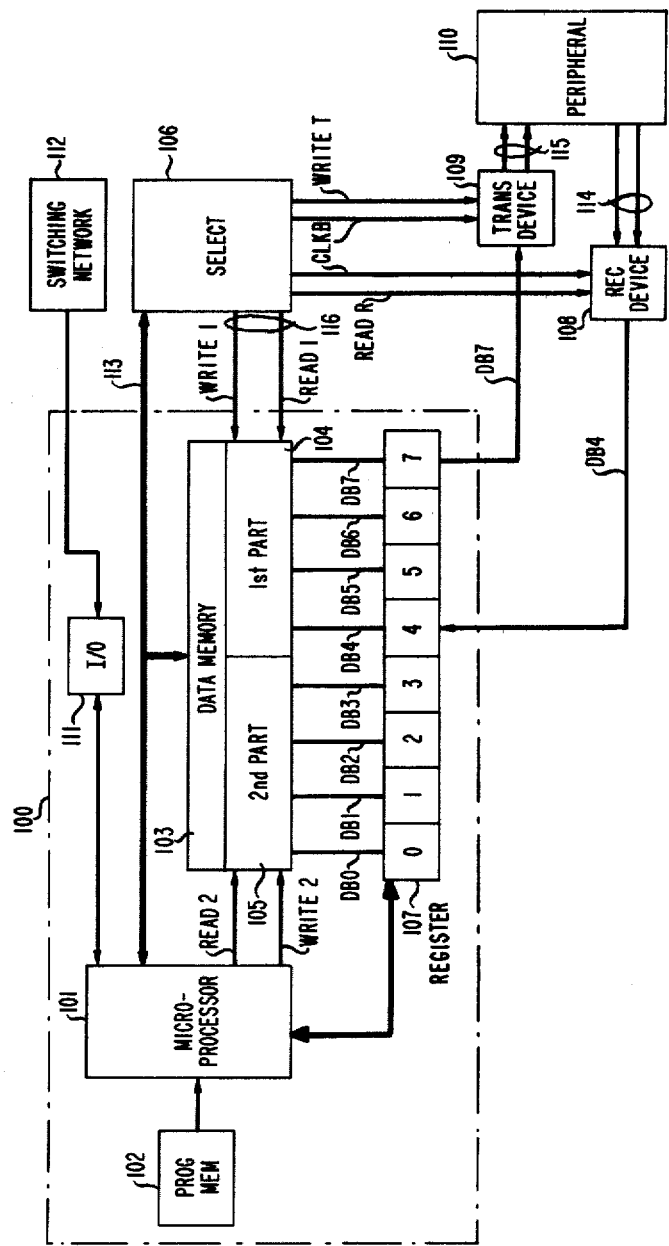
FIG. 1 shows a block diagram of an embodiment of the computer input/output arrangement.

With reference to FIG. 1, a basic microprocessor system block diagram 100 is shown connected through the disclosed inventive arrangement components 106, 107, 108 to peripheral equipment 110. Microprocessor central processor unit (CPU) 101 is, in the preferred embodiment, a Western Electric MAC-8 microprocessor as described basically in the article "MAC-8: A Microprocessor for Telecommunication Applications", *The Western Electric Engineer*, at page 41 et seq., July 1977 by Herbert H. Winfield, which is incorporated herein by reference. Program memory 102 is typically implemented by a read only memory (ROM) and contains the instructions which control microprocessor system 100 to perform the particular desired functions. The program information contained in ROM can be read but not changed by any units of the microprocessor system 100.

In the disclosed embodiment one of the desired functions to be performed is to interface a key telephone station console herein noted as peripheral equipment 110 with a switching network 112. Input/output circuit 111 provides a means for permitting communications between switching network 112 and microprocessor system 100.

Data memory 103 connects to microprocessor CPU 101 and is typically implemented as a random access memory (RAM) and is utilized to store data associated with performing the desired functions contained in program memory 102. With RAM, data can be read from or written to memory.

The basic operation scenario of microprocessor CPU 101 is to manipulate binary data from input/output circuit 111, register 107 or data memory 103 according to a predefined set of instructions, a program, stored in program memory 102. Microprocessor CPU 101 decodes and executes the instructions including performing calculations and making decisions based on these calculations for routing data or controlling information to the other elements of the microprocessor system 100.

The program in program memory 102 contains a sequence of program instruction and address fields. Microprocessor CPU 101 receives a program instruction consisting of an operation code and, if appropriate, an address field from program memory 102. Several clock cycles of CPU 101 form an instruction cycle during which CPU 101 performs memory reads, memory writes and internal operations to fetch and execute a program instruction. For example, the execution of a rotate command involves reading a word from a programmed address of data memory 103 into register 107, which is part of CPU 101. Once the data is in register 107 the data in bit location O is "rotated" to bit location 7 while, simultaneously, data in bit positions 7 through 1 are rotated into the next lower bit positions 6 through 0. Finally, the rearranged data word is written from register 107 into data memory 103.

The disclosed invention enables a peripheral read and write program instruction to occur during the operation of selected rotate program executions. The disclosed invention utilizes a data memory 103 including a section of memory having a first part 104 for storing a first portion of a data word and a second part 105 for storing a second portion of a data word. In the disclosed embodiment data memory 103 has an eight bit word divided into a first part of RAM memory 104 and a second part of RAM memory 105 each four bits wide. Each part of memory is separately accessible via the respective control leads, READ 1, READ 2, WRITE 1 and WRITE 2. Data bus DB0–DB3 connects RAM memory 105 with register 107 while DB4–DB7 connect RAM memory 104 with register 107.

Select device 106 determines whether register 107 obtains data exclusively from RAM memory 104 and 105, using lead READ 1, or data from a combination of receive device 108 and RAM memory 105 using lead READ R, as will be described later. Additionally, select device 106 controls whether register 107 is to output data exclusively to RAM memory 104 and 105, using lead WRITE 1, or to output data to a combination of the transmit device 109 and RAM memory 105, using lead WRITE T, as will be described later. Receive device 108 and transmit device 107 connect to peripheral equipment 110 and provide a means for exchanging data between peripheral equipment 110 and microprocessor 100.

Figure 3:
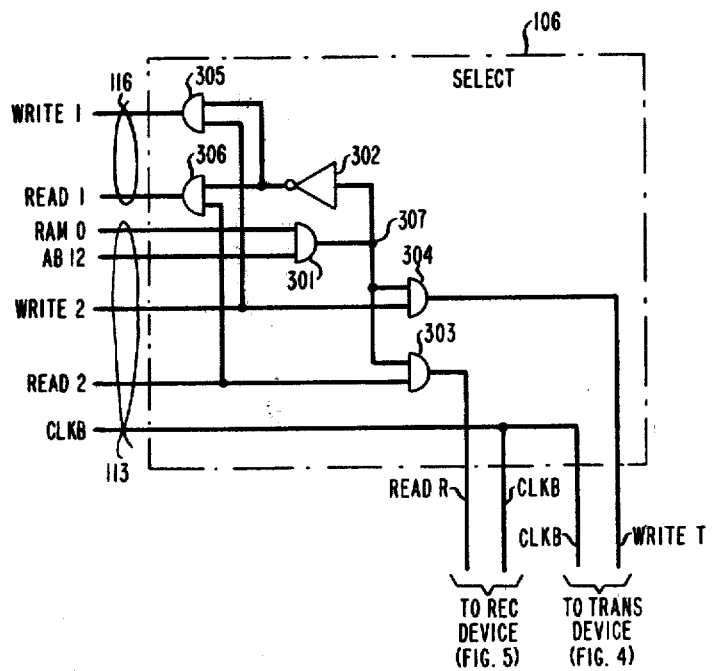
FIG. 3 shows a circuit diagram of an embodiment of the selecting circuit.

Control leads READ 1, READ R, WRITE 1, and WRITE T are controlled by select device 106 which is illustrated in detail in FIG. 3. With reference to FIG. 3 RAM output enable lead RAMO and other control leads originate in control bus 113 from microprocessor CPU 101. Address bit lead AB12 of control bus 113 indicates when bit 12 of the memory address is a logic 1. The disclosed invention utilizes bit 12 of the memory address word to indicate when the arrangement is to activate. Select circuit 106 utilizes the logic state of lead AB12 to determine whether register 107 receives data from RAM memory 104 and 105 or from receive device 108 and RAM memory 105 during a rotate instruction execution. As shown in FIG. 3 lead AB12 is Anded in gate 301 with lead RAM0 to produce control signal 307.

When the disclosed arrangement is not activated (lead RAM0=0 or lead AB12=0) control signal 307 is logic 0 and gates 303 and 304 are disabled. Gates 305 and 306, however, are enabled by the logic 1 output of inverter 302. When control signal 307 is logic 0, the disclosed arrangement is disabled and logic signals on leads READ 1 and WRITE 1 are the same as the logic signals on leads READ 2 and WRITE 2. Thus, both the first part 104 and second part 105 of RAM memory is controlled in unison as required for the performance of other programmed microprocessor functions.

When the disclosed arrangement is enabled by a logic 1 on leads AB12 and RAM0, control lead 307 is at logic 1 enabling NAND gate 303 and 304 while disabling gates 305 and 306 through inverter 302. During this enabled condition the signals READ T and WRITE T are replicas of signals READ 2 and WRITE 2. In this enabled condition, a read signal READ 2 during a rotate instruction execution results in a read from RAM memory 105 into register 107 while, simultaneously, read signal READ R enables receive device 108 to be read into bit 4 of register 107.

In a similar manner a write signal WRITE 2 during a rotate instruction execution results in a write from register 107 into RAM memory 105 while simultaneously write signal WRITE T enables transmit device 109 to receive the contents of bit 7 from register 107.

Clock lead CLKB ensures synchronization of receive device 108 and transmit device 109 with the operations of microprocessor 100. It is to be noted that the control leads utilized by select device 106 are leads which are available on the various printed circuit cards which incorporate the various components of microprocessor 100.

While the preferred embodiment of select device 106 utilizes a memory address lead (AB12) to enable it, other enabling embodiments are possible. For example, a flip-flop in the select device could be selectively enabled using a normal output signal from an output channel of microprocessor 100. When this flip-flop is set all subsequent rotate program instructions substitute the contents of receive device 108 and transmit device 107 as bit 4 and bit 7 in register 107 as previously described. When input/output operations between microprocessor 100 and peripheral device 112 are completed a microprocessor 100 output signal clears the flip-flop of select device 106. Thus, as in the prior arrangements, select device 106 operates under program control.

Figure 5:
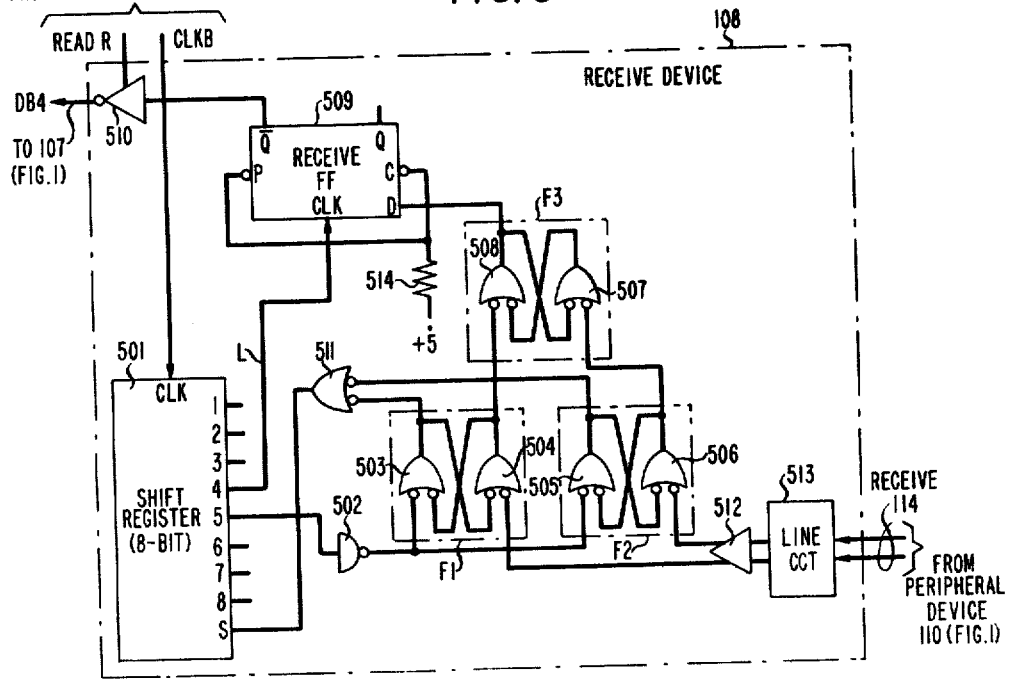
FIG. 5 shows a circuit diagram of an embodiment of the receive circuitry.

As shown in FIG. 5, receive device 108 interfaces with peripheral device 110 though line circuit 513 and facility 114. Line circuit 513 provides standard line impedance matching and biasing required by peripheral equipment 110. In the preferred embodiment, the invention is designed to communicate with peripheral equipment 110 having a serial bidirectional bipolar data communication format as described in U.S. Pat. No. 4,046,972 issued to D. D. Huizinga et al on Sept. 6, 1977 which is incorporated herein by reference. An embodiment of line circuit 513 is also described in the Huizinga patent.

Bipolar pulse transmission is described on page 920 of article entitled "Local Distribution System", *Bell System Technical Journal,* Vol. 54, No. 5, pages 919 et seq., May-June, 1975 by E. C. Bender et al, which is incorporated herein by reference.

Balanced amplifier 512 provides gain and provides logic level signals for gates 504 and 506.

Gates 503 and 504 form a set-reset flip-flop F1 for one output side of amplifier 512. Gates 505 and 506 form another set-reset flip-flop F2 for a second output side of amplifier 512. When a bipolar signal representing a logic 1 signal, as described in the above-referenced article, is received from a peripheral device 110, flip-flop F1 sets just prior to flip-flop F2. Flip-flop F2 sets before flip-flop F1 when the received bipolar signal is a log logic 0 signal. Note, flip-flops F1 and F2 are both set at the end of a reception of a bit of data. Thus, the order of setting of flip-flops F1 and F2 determines whether a logic 0 or 1 has been received.

Flip-flop F3 formed by gates 507 and 508 is set if a logic 1 signal is received and reset if a logic 0 signal is received. Receive flip-flop 509 is clocked by lead L to load the received data from flip-flop-F3. Gate 511 is a NOR gate for controlling shift register 501 via input S. Before any data is received (flip-flops F1 and F2 are reset) shift register 501 shifts logic 0's at the CLKB rate. As soon as either flip-flop F1 or F2 is set, gate 511 allows shift registers 501 to shift logic 1's. After four clock pulses on lead CLKB, flip-flop 509 is checked via lead L to either a set or reset state depending on the state of flip-flop F3. One clock pulse later flip-flops F1 and F2 are reset through gate 502. Shift register 501 shifts zeros until another data bit is received. Shift register 501 provides accurate delay timing to clock data into receive flip-flop 509.

Resistor 514 biases the preset (p) and clear lead (c) of receive flip-flop 509. The output of receive flip-flop 509 is coupled to tristate gate 510. An output signal appears on lead DB4 only when tristate gate 510 is enabled by lead READ R. Tristate gate 510 is disabled such that the output of gate 510 is essentially an open circuit when lead READ R is logic 0. Tristate gate 510 enables receive flip-flop 509 to share lead DB4 to register 107 with RAM memory 104 whose output leads DB4-DB7 are also tristate logic.

Returning to FIG. 1, during the read step of a rotate program instruction to an addressed memory location having a logic 1 in bit position 12 (AB12 is logic 10) of its address, the data from receive device 108 is loaded over lead DB4 into bit 4 of register 107. Data from memory bits 5 through 7 are loaded with random data because these leads are unterminated by the disabled tristate logic output of RAM memory 104.

Figure 2:
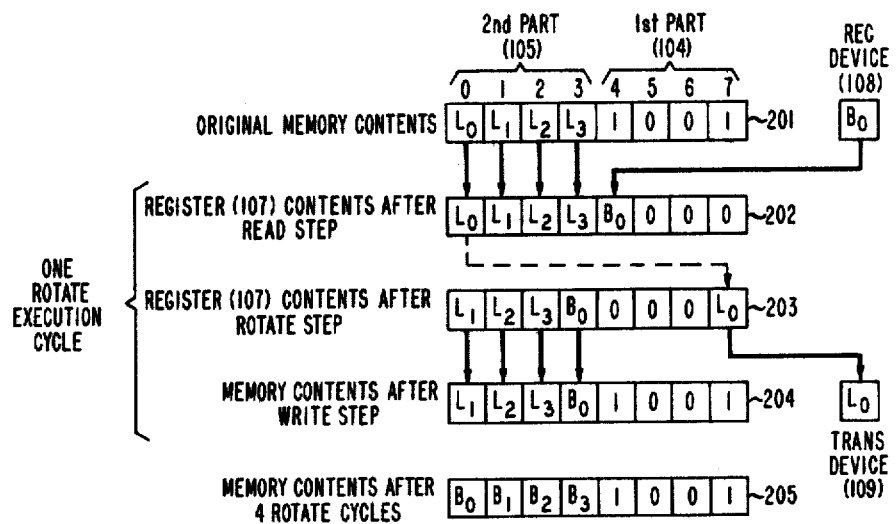
FIG. 2 shows the contents of data memory and a computer register during the various steps of the rotate program execution cycle.

FIG. 2 illustrates the data transfer when the disclosed arrangement is enabled. In step 201 the contents of the addressed memory is shown prior to being operated on by a rotate command. In step 202 the contents of register 107 is shown after the read step of the rotate instruction has simultaneously read the contents of RAM memory 105 and receive device 108. After the rotate step of the rotate command is completed, the contents of register 107 appears as shown in step 203 of FIG. 2. Note, that Lo the content of the lowest order bit is now positioned in bit location 7 and B0, receive device's 108 content, is now in bit position 3. Finally, as shown in step 204, during the write step of the rotate instruction the contents (L1,L2,L3,B0) of the lower four bits of register 107 are written into RAM memory 105 of the addressed memory location, from whence the read step was made. Note, referring to FIG. 1, the contents of bit position 7 of register 107 is not written into the addressed memory location (since no WRITE 1 pulse exists) but is outputted to transmit device 109 over lead DB7 by WRITE T pulse as described below. Thus, at the end of one rotate instruction one bit has been read out of memory and one new bit has been read into memory.

Figure 4:
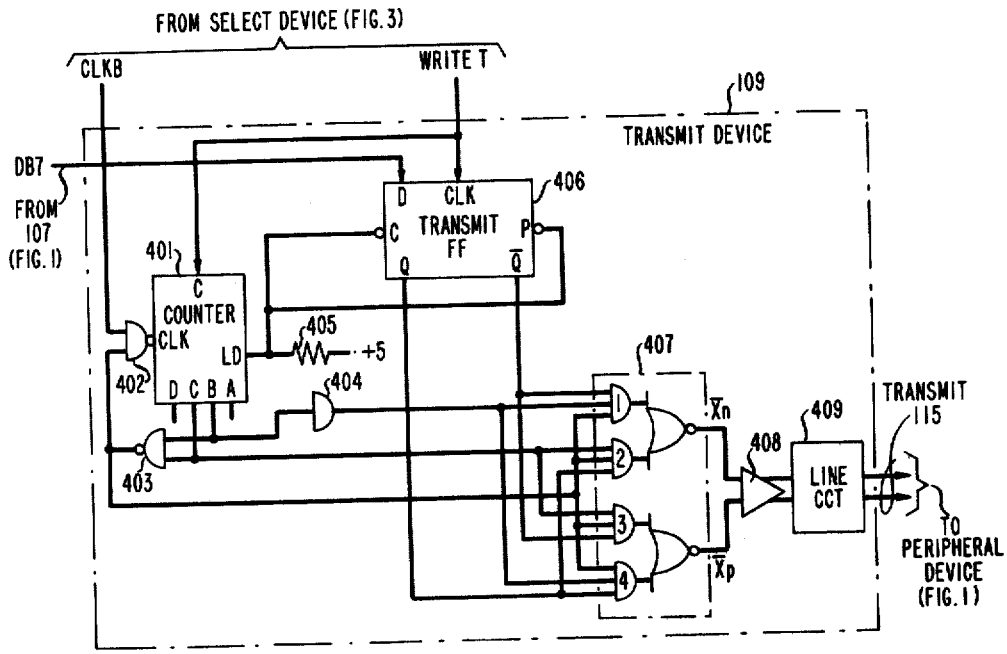
FIG. 4 shows a circuit diagram of an embodiment of the transmit circuitry.

Referring to select device 106 of FIG. 3, the signal on leads AB12 and RAM0 together enable one input of AND gate 304. When write signal WRITE 2 is a logic 1, the output of gate 304 provides a write transmit signal to WRITE T to transmit device 109 of FIG. 4. As shown in FIG. 4, lead WRITE T clocks transmit flip-flop 406 to read the contents of lead DB7 from register 107 of FIG. 1. Returning to FIG. 4, both outputs of flip-flop 406 are connected to dual AND-OR-INVERT device 407. Device 407 provides the mechanism for converting unipolar binary signal from flip-flop 406 into a bipolar signal which is outputted through amplifier 408 to line circuits 409 and hence to peripheral device 110 of FIG. 1 via facility 115. Device 407 in conjunction with devices 408 and 409 of FIG. 4 converts a logic 1 signal into a bipolar pulse having a positive pulse followed by a negative pulse. A logic 0 pulse is represented in bipolar form by a negative pulse followed by a positive pulse. Bipolar pulse transmission, as noted earlier, is described in the E. C. Bender et al article. The circuit timing for generating the bipolar pulses is provided by gates 402, 403, and 404 together with counter 401. Counter 401 is held in the sixth count state (A=D=0,B=C=1) by a logic 0 on the output of gate 403. When a data bit is desired to be written to transmit device 109 lead WRITE T pulses to logic 1, thereby writing data to transmit flip-flop 406 and clearing counter 401. Thus, counter 401 is free to start its counting function. A clock signal CLKB derived from microprocessor CPU 100 of FIG. 1 is gated through enabled gate 402 to advance counter 401.

Assuming a logic 1 on lead DB7, transmit flip-flop is set by the leading edge of pulse WRITE T. Thus, a logic 1 appears on output Q and a logic 0 on output $\overline{Q}$. Hence, only gates 2 and 4 of device 407 are activated. Output B of counter 401 switches to a logic 1 after the second clock pulse on lead CLKB and remains at logic 1 until the fourth clock pulse. Gate 404 buffers lead B, the divide by two output, of counter 401 and enables gate 4 and gate 1 of device 407. Between the count of 2 and 4 output C, the divide by four output of counter 401 is at logic 0 thus disabling gates 2 and 3 of device 407. The output of NAND gate 403, however, is logic 1 between the count of 0 and 6 and hence, gate 4 and gate 1 of 407 are enabled. A quick review of gates 1 through 4 of device 407 indicates that only AND gate 4 has all three inputs at a logic 1 state. Thus, lead $\overline{X}p$ pulses from logic 1 to logic 0 while lead $\overline{X}n$ remains at logic 1 level during counts 2 and 4 of counter 401. When the count of counter 401 exceeds count 4, lead C will become logic 1 until the count of 8 is reached. Note, however, that at count 6 the output of gate 403 inhibits any further counts and disables all gates of device 407. Between counts 4 and 6 only gate 2 of device 407 is enabled and, hence, lead $\overline{X}n$ pulses from logic 0 to logic 1 while lead $\overline{X}p$ remains at logic 1 level. Device 408 and line circuit 409 convert the resulting differential signal between leads $\overline{X}p$ and $\overline{X}n$ when transmit flip-flop 406 is set to a negative going pulse followed by a positive pulse with essentially no time interval between the trailing edge of the negative pulse and the leading edge of the positive pulse. The unused preset and clear leads of flip-flop 406 as well as unused leads of counter 401 are held at logic 1 voltage via resistor 405.

The logic level outputs of device 407 are gated through amplifier 408 to line circuit 409 which convert the signals to the bipolar format described above and drive the facility connecting peripheral device 110 with transmit device 109.

When more than one bit of information is to be exchanged between peripheral equipment 110 and microprocessor 100 the above rotate program sequence is repeated. In FIG. 2 the RAM memory content 209 is shown after four rotate commands are executed thus having transmitted data L0, L1, L2 and L3 to transmit device 106 and having received bits B0, B1, B2 and B3 from receive device.

In the preferred embodiment bits B0-B3 represent the status of key telephone station buttons and L0-L3 represents lamp control information when peripheral device 110 is key telephone type equipment. Since there are many bits of information to be exchanged, a bit at a time, during the data burst from the key telephone equipment the microprocessor is programmed to execute a sequence of rotate instructions with no interruptions or other instructions between them. This is accomplished by disabling the microprocessor's interrupt structure and executing multiple rotate instructions. The logic circuitry illustrated in the prior described embodiment is constructed using commercially available logic integrated circuits or their equivalents.

While the above disclosure describes an input/output interface arrangement between one peripheral unit and a computer, it is obvious that multiple peripheral units could be interfaced to a computer in the described manner. Additionally, the selective reading and writing of data memory 103 could be accomplished using other well known gating circuits. Likewise, the relative bit positions of the receive and transmit data in register 107 can be arranged in any manner consistent with the rotate command utilized to implement the disclosed invention.

What has been described is illustrative of the invention. Other embodiments known to those skilled in the art could provide similar functions without deviating from the scope of the disclosed invention.

I claim:

1. A computer arrangement for data communication with serial data operated peripheral equipment, said computer arrangement including a central control means arranged to operate under program control, a program memory means for storing said program control, a data memory means having a first and a second part for storing data words, and a shift register means having a first and a second part connected to said first and second parts of said data memory means respectively for temporarily storing data words associated with the operation of said program control, said computer arrangement further includes a transmit device connected to said first part of said register means for outputting a bit of data to said peripheral equipment;

a receive device connected to said first part of said register means for receiving a bit of data from said peripheral equipment;

a rotate program command means operable under program control for reading a word from an addressed data memory location into said register means and rotating said data a fixed number of bits and writing said word into said addressed data memory location;

characterized in that said computer arrangement further includes selecting means connected to said receive device, said transmit device and said first part of said data memory means and operable under central control means for selecting (1) during the word reading phase of said rotate means whether information from said first part of said addressed data memory or information from said receive device is read into said first part of said register means and (2) during the work writing phase of said rotate means whether information from said first part of said register means is written into said first part of said addressed data memory or into said transmit device; and wherein said selecting means and said rotate means operate jointly under program control to enable a simultaneous data read from both said second part of said addressed data memory location and said receive device into said second and first parts respectively of said register means, said rotate means rotating said data a fixed number of bits such that data from said receive device is rotated into said second part of said register means while data of said second part of said register means is rotated into said first part of said register means, said selecting means and said rotate means operate jointly to write simultaneously the second and first part of the resulting data word in said register means into said second part of said addressed memory location and said transmit device respectively, the joint operation of said selecting means and said rotate means resulting in a simultaneous read and write sequence between said transmit and receive devices and said data memory means within the execution time period of said rotate means.

2. The computer arrangement of claim 1 characterized in that
said selecting means is enabled by addressing selected locations of data memory under program control.

3. The computer arrangement of claim 1 characterized in that
said selecting means is enabled by detecting a specific memory address bit in said rotate command means.

4. The computer arrangement of claim 1 characterized in that
said data memory means is constructed of at least two separately accessible memory devices which together equal the data word width of said data memory means.

5. The computer arrangement of claim 1 characterized in that
said transmit device includes means for storing binary data from said peripheral equipment, and
said receive device includes means for storing binary data for said peripheral equipment.

6. The computer arrangement of claim 1 characterized in that
said storing means of said transmit device includes a flip-flop circuit, and
said storing means of said receive device includes a flip-flip circuit.

7. The computer arrangement of claim 1 characterized in that
said transmit device is arranged to output bipolar data to said peripheral equipment, and
said receiver device is arranged to receive bipolar data from said peripheral equipment.

8. A computer input/output interface for a computer arrangement, said interface communicating data between said computer arrangement and connected peripheral equipment, said computer arrangement including a shift register means for inputting and outputting data, a data memory means having first and second part connected to a first and second part respectively of said shift register, said computer arrangement operable under rotate command means, said rotate command means having a read phase for reading data from an addressed data memory means into said register means, a rotate phase for rotating said data in said register means a fixed number of bits and a write phase for writing said word into said addressed memory means from said register means characterized in that said input/output interface includes a transmit device for controlling data from said first part of said register means to said peripheral equipment, a receive device for inputting data from said peripheral equipment to first part of said register means and selecting means for controlling the read and write operation of said receive device, said transmit device and first part of said data memory means and operable under computer control in executing a selected rotate command to a predetermined addressed data memory means, said selecting means including read enabling means operable during a read phase of an executing selected rotate command for enabling a data read from said receive device into said first part of said register means, read disabling means operable concurrently with said read enabling means for disabling a data read from said first part of said predetermined addressed memory means into said first part of said register means, write enabling means operable during a write phase of an executing selected rotate command for enabling a data write from said first part of said register means into said transmit device, and write disabling means operable concurrently with said write enabling means for disabling a data write from said first part of said register means into said first part of said predetermined addressed memory means.

9. The computer interface of claim 8 characterized in that
said selecting means is enabled by detecting a most significant bit of said predetermined addressed data memory means in said rotate command means.

10. The computer interface of claim 8 characterized in that
said data memory means is constructed of at least two separately accessible memory devices which together equal the data word width of said data memory means.

11. The computer interface of claim 8 characterized in that
said transmit device includes means for storing binary data from said peripheral equipment, and
said receive device includes means for storing binary data for said peripheral equipment.

12. A data communication arrangement for interfacing a communication system with a burst data operated key telephone station set which simultaneously transmits serial binary bit status information to and receives serial binary bit control signals from said communication system, said system having a reading and writing data rate faster than the average data rate of said station set but incapable of reading and writing at said burst data rate of said station set, said system capable of performing a rotate memory instruction faster than said corresponding burst data rate of said station set, said communication system including a control means operating under program control, a data word memory means having word storage split into a first and a second independently accessible parts and a rotate means operable under program control having a read phase for reading the contents of the first and second parts of a data memory location of said data memory means into a first and a second part of a shift register respectively, a rotate phase for rotating the contents of said register a fixed number of bits and a writing phase for writing said register contents into said data memory location characterized in that
said communication arrangement includes a receive device connected to said first part of said register and arranged to receive serial binary bit data from said key station set;

a transmit device connected to said first part of said register and arranged to transmit serial binary bit data to said key station set;

a read selecting means operable during a read phase of a rotate means operation on a preselected data memory location for selectively reading into said first part of said register a data bit from said receive device rather than reading a data bit from a first part of said preselected data memory location while said rotate means simultaneously reads data from a second part of said preselected data memory location into said second part of said register;

said rotate means operative during said rotate phase of said preselected rotate means operation for rotating the received data bit located in said first part of said register into said second part of said register while simultaneously rotating a transmit data bit from said second part of said register into said first part of said register and a write selecting means operable during said write phase of said preselected rotate means operation for selectively writing said transmit data bit from said first part of said register into said transmit device rather than writing said transmit bit into said first part of said preselected data memory location while said rotate means simultaneously writes data into said second part of said preselected data location from said second part of said register.

13. The data communication of claim 12 characterized in that
said read selecting means and said write selecting means are enabled by detecting a specific memory address of said rotate means.

* * * * *